United States Patent
Chen et al.

(10) Patent No.: US 9,109,846 B2
(45) Date of Patent: Aug. 18, 2015

(54) POLYMER SHEETS AND OTHER BODIES HAVING ORIENTED CHAINS AND METHOD AND APPARATUS FOR PRODUCING SAME

(75) Inventors: Gang Chen, Carlisle, MA (US); Erik Skow, Ketchikan, AK (US); Xiaoyuan Chen, Acton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1275 days.

(21) Appl. No.: 12/598,827

(22) PCT Filed: Apr. 17, 2008

(86) PCT No.: PCT/US2008/004948
§ 371 (c)(1),
(2), (4) Date: Jul. 30, 2010

(87) PCT Pub. No.: WO2008/136912
PCT Pub. Date: Nov. 13, 2008

(65) Prior Publication Data
US 2010/0301258 A1    Dec. 2, 2010

Related U.S. Application Data

(60) Provisional application No. 60/928,023, filed on May 7, 2007.

(51) Int. Cl.
  *C09K 5/00* (2006.01)
  *B29C 59/02* (2006.01)
  *B28B 11/08* (2006.01)
  *F28F 21/06* (2006.01)
(Continued)

(52) U.S. Cl.
  CPC . *F28F 21/06* (2013.01); *C08J 5/18* (2013.01); *C08J 2323/06* (2013.01); *F28F 1/24* (2013.01)

(58) Field of Classification Search
  CPC ............................................. C08J 5/18
  USPC ............................. 252/71; 524/292, 496, 495
  See application file for complete search history.

(56) References Cited

U.S. PATENT DOCUMENTS 4,734,196 A * 3/1988 Kono et al. ............... 210/500.36
5,407,623 A * 4/1995 Zachariades et al. ......... 264/119
6,007,657 A   12/1999 Eddy et al.
(Continued)

FOREIGN PATENT DOCUMENTS

EP    1384567 A1    1/2004
EP    1519217 A1    3/2005
(Continued)

OTHER PUBLICATIONS

International Search Report and Written Opinion mailed Jun. 18, 2008 in International Patent Application Serial No. PCT/US2008/004948 filed Apr. 17, 2008.
(Continued)

*Primary Examiner* — Jane L Stanley
(74) *Attorney, Agent, or Firm* — Wolf, Greenfield & Sacks, P.C.

(57) ABSTRACT

Sheets that are made up of oriented polymer chains are provided. Chains of polymer may be oriented or substantially aligned in one or more directions exhibiting enhanced thermal conductivity along the direction of orientation. Orientation of polymers within sheets may lead to a wide range of thermally relevant applications.

31 Claims, 4 Drawing Sheets

(51) Int. Cl.
*C08J 5/18* (2006.01)
*F28F 1/24* (2006.01)

(56) References Cited

U.S. PATENT DOCUMENTS

| | | | |
|---|---|---|---|
| 6,025,061 A * | 2/2000 | Khanarian et al. | 428/221 |
| 7,189,778 B2 * | 3/2007 | Tobita et al. | 524/495 |
| 2002/0160268 A1 * | 10/2002 | Yamaguchi et al. | 429/254 |
| 2004/0152829 A1 * | 8/2004 | Tobita et al. | 524/595 |

FOREIGN PATENT DOCUMENTS

| JP | 1992-246453 | 6/1992 |
|---|---|---|
| JP | 2002-398501 | 2/2002 |
| JP | 2004-536278 | 7/2004 |

OTHER PUBLICATIONS

[No Author Listed] Database WPI Week 200452, Derwent Publications Ltd., London, GB; AN 2004-536278; XP002483766 & JP 2004 188286 A; Jul. 8, 2004.

[No Author Listed] Database WPI Week 200243, Derwent Publications Ltd., London, GB; AN 2002-398501; XP002483767 & JP 2002 046170 A; Feb. 12, 2002.

[No Author Listed] Database WPI Week 199230, Derwent Publications Ltd., London, GB; AN 1992-246453; XP002483768 & JP 04 166328 A; Jun. 12, 1992.

* cited by examiner

POLYMER SHEETS AND OTHER BODIES HAVING ORIENTED CHAINS AND METHOD AND APPARATUS FOR PRODUCING SAME

BACKGROUND OF INVENTION

1. Field of Invention

The present invention relates to oriented polymer chains, e.g., for use in thermal applications such as heat spreading.

2. Discussion of Related Art

Polymer plastics have been widely used for a variety of applications due to their low manufacturing cost, non-reactive stability, and electrically insulating nature. Polymers can be processed to exhibit strong mechanical properties while still remaining lightweight, for example, making them ideal for packaging and protective use. However, polymers generally exhibit low thermal conductivity, limiting their use in heat distributing or spreading type functions. It would be beneficial for the thermal conductivity of polymer plastics to be tailored, allowing these materials to branch out into an even wider space of industry applications.

The low thermal conductivity properties indicative of most polymers is attributed to two main factors. The first factor is gyration of the polymer chains, which shortens the effective mean free path of thermal lattice vibrations within the polymer. The second factor is the presence of weak inter-chain links, which serve to create thermal boundary resistance between the chains. However, single polymer chains are known to exhibit very high thermal conductivity along the polymer chain direction. For example, polyethylene (PE) fibers have been observed to have a thermal conductivity of about 20 W/mK.

SUMMARY OF INVENTION

The inventors have appreciated that it would be beneficial to have order-based highly thermally conductive polymer materials in two dimensional (2D) conducting format such as for thin heat spreaders and in 3D conducting format such as in heat exchangers.

In one aspect, a sheet material includes at least one layer having a width and length substantially larger than a thickness of the layer of substantially aligned polymer chains wherein the layer exhibits anisotropic thermal conductivity. The aligned polymer chains may include one or a combination of ultra high molecular weight polyethylene (UHMWPE), polyethylene (PE), polytetrafluoroethylene (PTFE), polyester, poly(p-phenylene sulfide) and/or other suitable polymer materials. The sheet may exhibit a thermal conductivity greater than 10, 50, 100, 200, or 400 W/mK in at least one preferred direction which may be along the aligned polymer chains. The anisotropic thermal conductivity may be 10, 50, 100, 250, 500, 1000, 2000, or 4000 times greater in one direction as compared to another direction. The sheet material may be made to have a stretch ratio greater than 10, 25, 50, or 200 relative to a starting precursor. The sheet can be formed by uni-directional or bi-directional stretching. The sheet material can also include additives, wherein the additives comprise one or a combination of carbon nanotubes or graphite layers and can be substantially aligned. The sheet material thickness can be less than 1000, 500, 100, or 50 nanometers, greater than 0.005, 0.05, 0.5, 1, or 5 millimeters or fall into a range in between.

Although in various aspects of the invention, a sheet material includes a desired polymer chain orientation and anisotropic thermal conductivity characteristics, bodies with other forms may include oriented polymer chains and anisotropic thermal conductivity characteristics in accordance with aspects of the invention, such as a block, rod, and other suitable forms whether regular or irregular. Also, a sheet or other body in accordance with aspects of the invention may be molded or otherwise formed (e.g., thermoformed) into any suitable shape while retaining anisotropic thermal characteristics. As described in detail below, sheets and other bodies in accordance with aspects of the invention may be incorporated into a wide variety of arrangements and applications.

A method of forming a polymer sheet is also provided and may include providing a polymer precursor having a first polymer chain orientation and modifying the polymer chain orientation of the precursor to form a sheet having a second polymer chain orientation in which chains are substantially more aligned than the first polymer chain orientation and such that the sheet exhibits anisotropic thermal conductivity. In one illustrative embodiment, modifying the polymer chain orientation comprises suitably modifying intermolecular chain bonding, e.g., wherein a solvent is introduced to portions of the polymer precursor. Modifying polymer chain orientation may also involve heating a precursor to a specified temperature, typically ranging between 100-150° C., e.g., by placing the precursor in a heated solvent, by mechanical stretching, imparting shear, fast quenching, administering polarized light, spin coating, injection molding, extrusion, gyration control, cooling rate control, or combinations thereof.

In another aspect, an article of manufacture may include a sheet or other body including substantially aligned polymer chains that function to distribute heat anisotropically along at least one preferred direction of the sheet or other body. Some applications include heat exchangers, a heat spreading layer, e.g., in a printed circuit board, room heater, a protective coating, hull, or pipeline. A sheet or other body in accordance with aspects of the invention may be included as a component in a seating device, such as a chair, couch, car seat, bench, or any similar article, a drinking device, such as a cup, glass, mug, or any similar article. In another embodiment, a sheet or other body in accordance with aspects of the invention may be included as a component in an article of clothing, such as a glove, shirt, shoe, jacket, coat, boot, or any wearable article, a component in electronics device or packaging, such as cellular phones, portable audio, or portable video devices, a portable computer, a desktop computer, a portable audio device, or a battery.

These and other aspects of the invention will be appreciated from the following description and claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Aspects of the invention are not limited in application to the details of construction and the arrangement of components set forth in the following description or illustrated in the drawings. Aspects of the invention are capable of other embodiments and of being practiced or of being carried out in various ways. In addition, aspects of the invention may be used alone and/or in any suitable combination with any other aspect(s) of the invention. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

As used herein, a "sheet" includes an article that has dimensions substantially greater in two directions, i.e., length and width, than in a third direction, i.e., thickness. A sheet can be flexible, rigid, and/or substantially molded, moldable or deformable into a variety of shapes, irregularities, sizes, and other forms. Sheets may include one or a plurality of layers. Although sheets can take on a substantially planar form, they are not limited to being planar. The properties described here of a sheet are meant to be descriptive, but not limiting in any way. One aspect of the invention provides a polymer sheet or other body form where chains of polymer in the sheet or body are oriented or substantially aligned in one or more directions such that the sheet or other body exhibits thermal conductivity along oriented polymer chains. In one embodiment, the chains may be aligned in one direction, but not all embodiments in accordance with the invention are limited to one direction of chain orientation. Aspects of the invention presented herein can be used in a wide range of thermally relevant applications, as described in more detail below.

Figure 1A:
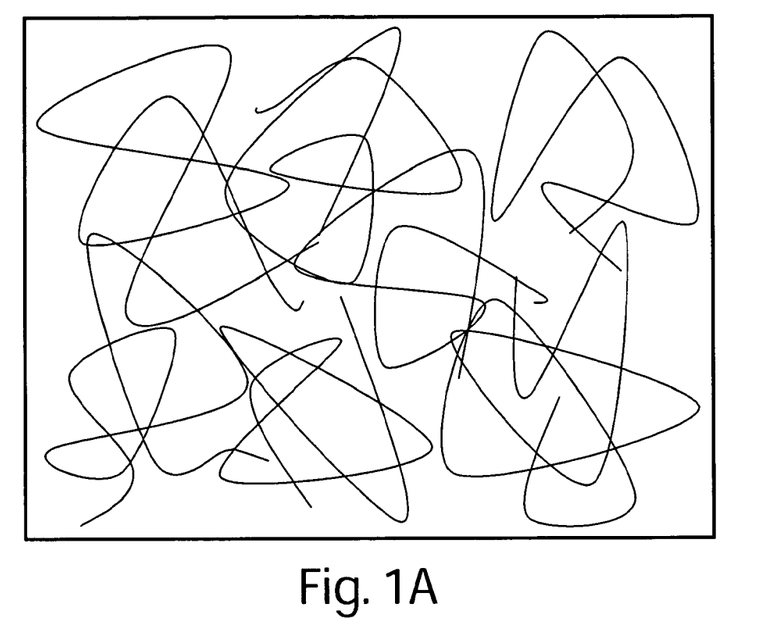
FIG. 1A is a schematic of a conventional polymer mixture with chains arranged in a disordered array.

FIG. 1A illustrates a conventional polymer mixture with chains that are tangled or otherwise oriented in a disordered array. Here, chains are bonded together or otherwise arranged randomly and phonons are scattered between molecules. As a result, polymers conform to preferred entropic configurations where the thermal conductivity is reduced due to heat flux looping and weak inter-chain coupling. For polymers that are not aligned in any preferred direction, the thermal conductivity will typically range between 0.1 and 1 W/mK.

Figure 1B:
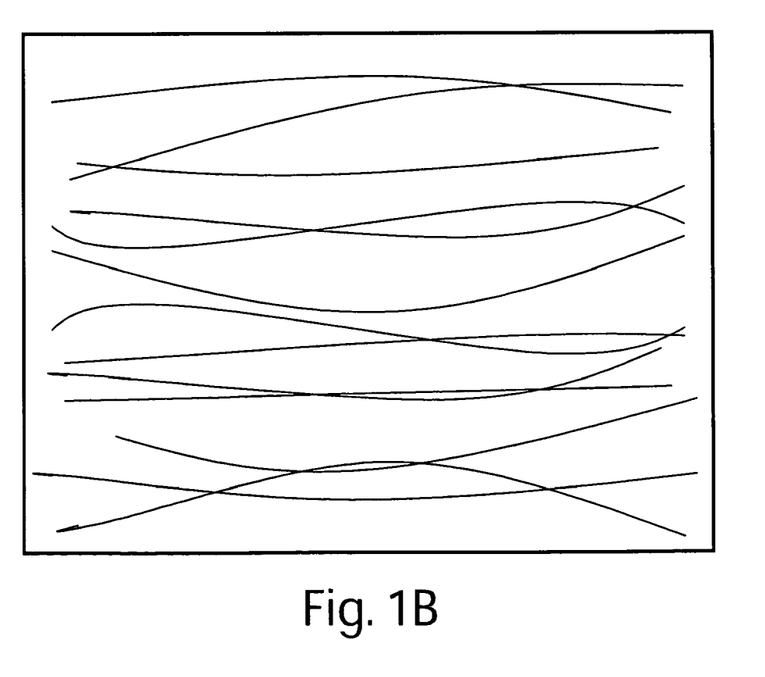
FIG. 1B is a schematic of a polymer with chains significantly aligned in one direction.

FIG. 1B reveals one embodiment of a polymer sheet in accordance with aspects of the invention with chains significantly aligned in one direction, giving rise to increased thermal conductivity that, in some embodiments, can be greater than 10 W/mK along the direction of chain orientation. In some embodiments, thermal conductivity values along the direction of chain orientation can range from 20 to 400 W/mK, and beyond. The degree of chain alignment within polymer sheets may vary depending on the desired level of thermally conductive anisotropy. Examples of polymers that can be oriented in this fashion include at least one or a combination of polyethylene (PE), ultra high molecular weight polyethylene (UHMWPE), polytetrafluoroethylene (PTFE), polyester, and poly(p-phenylene sulfide).

In one embodiment, substantially oriented polymer chains may be included in a sheet that is formed with a stretch ratio that ranges between 40 and 400 relative to the starting non-oriented long-chain polymer precursors such as in preformed plates or powders. A precursor may be any suitable collection of polymer material that is used to form a polymer sheet or other object having oriented polymer chains in accordance with aspects of the invention. Thus, precursors may take the shape of a sheet, block, ball, pill, bar, powder, or any other suitable form. In some embodiments, the stretch ratio can be greater than 400. Similarly, sheet thickness can range between 50 nanometers and 5 millimeters. However, in some embodiments, sheet thickness can be less than 50 nanometers or greater than 5 millimeters. Sheet length and width are generally defined to be substantially greater than the thickness and are not limited in their overall size, shape, or aspect ratio.

In accordance with aspects of the invention, thermal conductivity can also be modified in more than one direction by multi-layering where several layers of uni-directionally aligned polymer chains are laminated or otherwise arranged such that there are at least two major polymer chain directions giving rise to at least two preferred thermal conductivity directions. In some embodiments, polymer sheets may be stretched in more than one direction so as to achieve multi-directional thermal conductivity.

Thermal conductivity can also be modified by including thermally conductive additive materials to the polymer sheet system. Such materials that may be added to the sheets include, but are not limited to, boron nitride, carbon nanotubes (CNTs), and graphite layers. Such additives may be used to modify the thermal conductivity of a sheet in anisotropic fashion. For example, a sheet having this type of additive may have its overall thermal conductivity increased, yet still have an anisotropic thermal conductivity, e.g., such that the sheet is more thermally conductive in a direction along the polymer chain alignment. Anisotropic additives, such as CNTs, can also be used with a sheet, and have additive components oriented such that upon addition to the sheet system, overall thermal conductivity is modified (e.g., increased) in the direction of additive alignment. It is particularly attractive to use such anisotropic additives to increase the thermal conductivity in directions perpendicular to the chain alignments so that the sheet has high thermal conductivity values in multiple directions, although these values are not necessarily the same. Additive alignment may be made in any suitable way, e.g., in some embodiments, anisotropic additives may be aligned along the preferred polymer chain direction, whereas in other embodiments, anisotropic additives may be aligned perpendicular to or otherwise transverse to the preferred polymer chain direction. Additives can be incorporated within the polymer sheets themselves, or included in any other suitable fashion.

Polymer sheets and other bodies in accordance with aspects of the invention may be formed in any suitable way. One process of modifying thermal conductivity anisotropically in a sheet involves orienting the polymers within the sheet so that they are substantially aligned relative to one another. Chain orientation may be achieved in any suitable way, whether by stretching or otherwise processing a polymer precursor and/or inducing chain orientation when forming a precursor or polymer sheet, e.g., during an extrusion process. In one embodiment, a polymer precursor in the form of a sheet-shaped material may be stretched so that polymer chains in the precursor are caused to generally align with each other and along the stretch direction. Although not required, prior to and/or during stretching, the precursor may be processed to reduce or weaken bonding between chains to allow for more effective stretching and chain orientation. Such weakening and/or reduction in inter-chain bonding may be effected by heating (whether by convection, conduction and/or radiation), application of a solvent or other material, or other suitable means such as a combination of heating and solvent. In some embodiments, uniform heating of the polymer chains can be achieved by placing the sheet in a temperature controlled medium, such as corn oil.

As mentioned above, stretching is not the only way in which polymer chains may be oriented relative to each other. Alternative methods to control chain orientation in a polymer precursor or finished product include shear flow, fast quenching, polarized light, spin coating, injection molding, extrusion electro-spinning and others. Extrusion can include melt deformation, where the polymer is heated to a molten state and extruded to cause flow-induced orientation, or solid-phase deformation, where the polymer is extruded while solid at elevated temperatures around 110° C. Gyration control can also occur through molding or pressing of very thin films. Accordingly, it should be understood that aspects of the invention are not limited to any particular technique used to orient polymer chains in a sheet.

In one illustrative embodiment, an UHMWPE precursor of any size, shape and/or thickness may be placed in a solvent, such as xylene or decahydronaphthalene (decalin) which is heated to around 120° C., such that the polymer swells into a uniform translucent gel. The solvent, in this case xylene, may serve to disrupt the intermolecular bonding, effectively "loosening" the structure so that chains can be repositioned more easily. The gel-like sheet can then be mechanically stretched uni-directionally to several times its initial length, e.g., with a stretch ratio of 5 to 100 or more. In some embodiments, stretching can be performed using a machine with similar rotating shafts on either end so that stresses are distributed evenly throughout the material. The shafts are constructed out of aluminum and the nuts that hold them in place along with rotating them are made of steel so that the bolts do not become loose when the overall system is heated to ~120° C.

Once the desired stretch ratio is achieved, the sheet can be removed from the solvent, which is allowed to evaporate from the sheet. Recovery of the solvent by condensation can reduce the consumption of solvent. In order to remove excess solvent and/or air pockets, the sheet may be squeezed between rollers or otherwise pressed into a desired shape. Controlling cooling rate can also aid in polymer orientation through alternating media such as air and hot bath, as well as sequential rolling.

As mentioned above, additives such as carbon nanotubes (CNTs) and graphite layers can be used to enhance or otherwise alter thermal conductivity of a polymer sheet in the desired directions. CNTs, for example, are anisotropic in nature and therefore can be oriented or aligned in a preferred direction. For the purpose of clarity, CNTs will be used as an example, but not a limitation, for how additives can be used to enhance thermal conductivity in polymer sheets. In some embodiments, the CNTs are initially aligned with polymers infiltrated into the CNT array, followed by aligning the polymer chains, by stretching or other means, such that the polymer chains are oriented perpendicular to the CNTs. In other embodiments, CNTs can be dispersed throughout the polymer sheet and as the system undergoes alignment, through stretching or any other suitable means, the CNTs are stretched alongside polymer chains. Introducing oriented CNTs to sheets in the direction along the polymer chains may serve to increase thermal conductivity in the stretch direction. Introducing oriented CNTs to sheets in the direction perpendicular to the polymer chains within the immediate plane of the sheet may serve to increase thermal conductivity perpendicular to the stretch direction.

In accordance with aspects of the invention, a polymer sheet may exhibit increased thermally conductive properties bi-directionally. Such additional anistropy can be achieved through incorporation of anisotropic additives, such as, but not limited to, CNTs, as mentioned previously. In some embodiments, a plurality of layers of thermally unidirectional polymers can be laminated together so that polymer chains are substantially aligned in more than one direction. In other embodiments, simultaneous bi-axial stretching can be carried out on a single sheet. It is also possible for a single sheet to be uni-axially stretched in one direction and subsequently uni-axially stretched in another direction to achieve bi-directional thermal conductivity. In general, large increases in thermal conductivity in one direction, i.e., the chain direction, will not necessarily cause reduction of thermal conductivity in the perpendicular directions.

As mentioned previously, low cost, low weight, moldable, flexible, corrosion resistant, chemically and environmentally resilient, electrically insulating polymer sheets that also demonstrate high degrees of thermal conductivity can be used for a wide-ranging scope of applications. Some of these applications include, but are not limited to, heat exchanging, spreading or other transfer, electronic packaging, cases, and portable electronics devices. The range of use could also be extended to every day articles such as apparel, seats, containers, and drink holders. In the embodiments described below, the direction of chain orientation, i.e., thermal conductive anisotropy, is indicated by arrows, but is not limited to one direction.

Figure 2A:
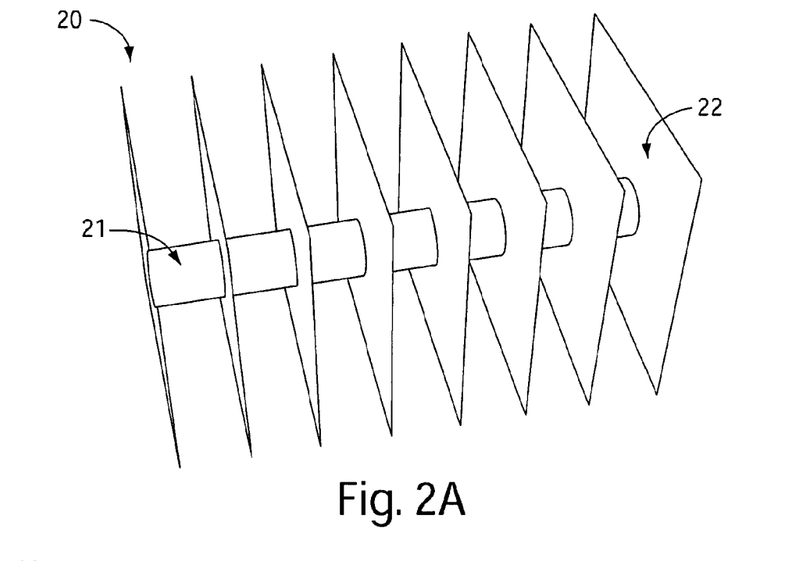
FIG. 2A is a heat exchanger composed of a pipe with multiple heat spreading plates or fins according to one embodiment of the invention.
Figure 2B:
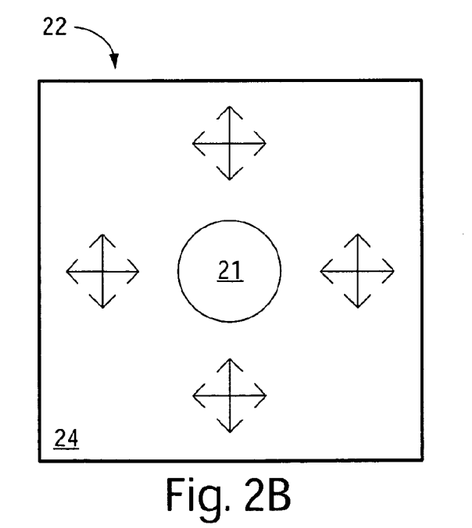
FIG. 2B is one example of a detailed top view of an individual square heat spreading plate from the heat exchanger in FIG. 2A where the arrows depict the direction of molecular orientation according to one embodiment of the invention.
Figure 2C:
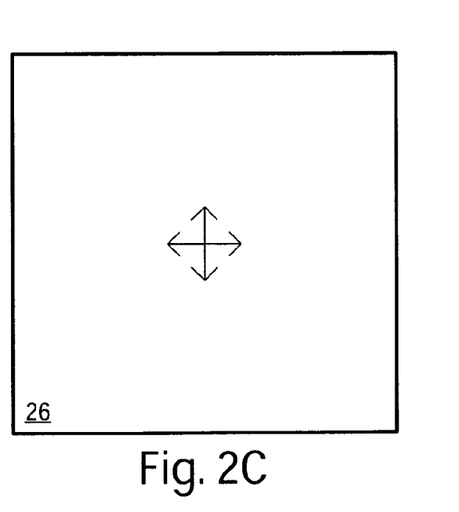
FIG. 2C is another example of a detailed bottom view of an individual square heat spreading plate from the heat exchanger in FIG. 2A where the arrows depict the direction of molecular orientation according to one embodiment of the invention.
Figure 2D:
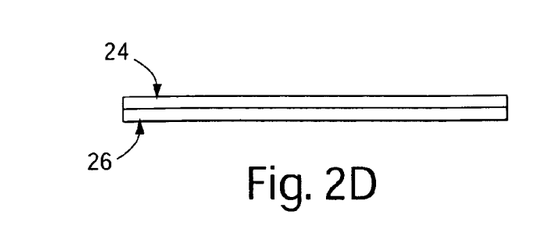
FIG. 2D is a side view of the individual square heat spreading plate in FIGS. 2B and 2C.

In some embodiments, sheets in accordance with aspects of the invention are incorporated in a heat exchanger 20 shown in FIG. 2A, which includes a pipe 21 with multiple heat spreading plates (or fins) 22. One side of a heat spreading plate is shown in FIG. 2B where the polymer material 24 is processed in such a way that the thermal conductivity runs in two perpendicular directions throughout the entire sheet. The other side of the heat spreading plate is shown in FIG. 2C where the polymer 26 continues to exhibit thermally conductive bi-directionality. FIG. 2D depicts a side view profile of the heat spreading plate. This type of application can be ascribed to fin format as in traditional heat exchangers, ranging from small components inside electrical and electronic devices such as computers to the large sized room heaters to industrial heat exchangers. The fins can hold a variety of shapes as in the current state of the art. Because polymers are easy to shape, such fins can also have non-uniform thickness. Polymer sheets can be resistant to corrosion and marine growth as well, allowing for further applications in marine systems, e.g., aquatic heat exchangers, ship coatings, pipelines, hulls for boats and kayaks, etc. In heat exchanger and heat sinking applications, these polymers can also be used as pipes and substrates that host the fins.

Figure 3A:
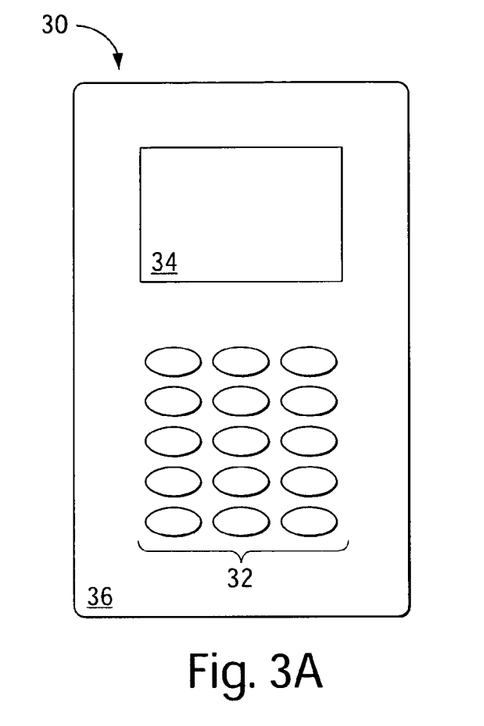
FIG. 3A is a front view of a personal electronics case where the arrows depict the direction of molecular orientation according to one embodiment of the invention.
Figure 3B:
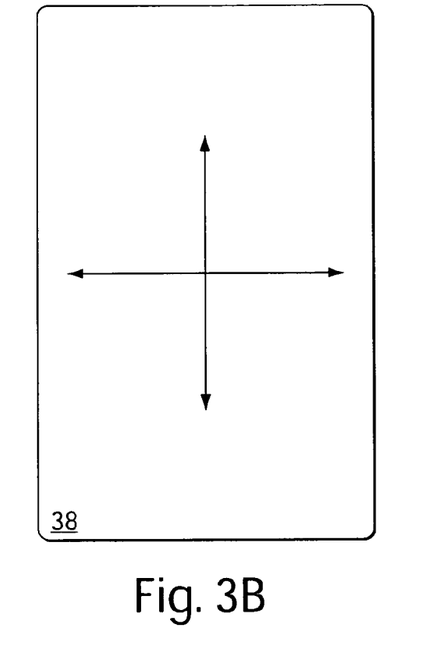
FIG. 3B is a back view of a personal electronics case where the arrows depict the direction of molecular orientation according to one embodiment of the invention.

Oriented polymer sheets that exhibit suitable thermal conductivity can be manufactured as casings for devices such as laptop computers, audio or video devices, and other portable electronic devices by spreading out or otherwise conducting the heat generated from the electronics, e.g., reducing the temperature of key components. FIG. 3A illustrates the front side of a personal electronics case 30. Here, a keypad 32 and a display screen 34 are surrounded by an oriented polymer sheet 36. The back of the case 30 given by FIG. 3B also comprises an oriented polymer sheet 38 that covers the entire back face, conducting in multiple directions.

Figure 4A:
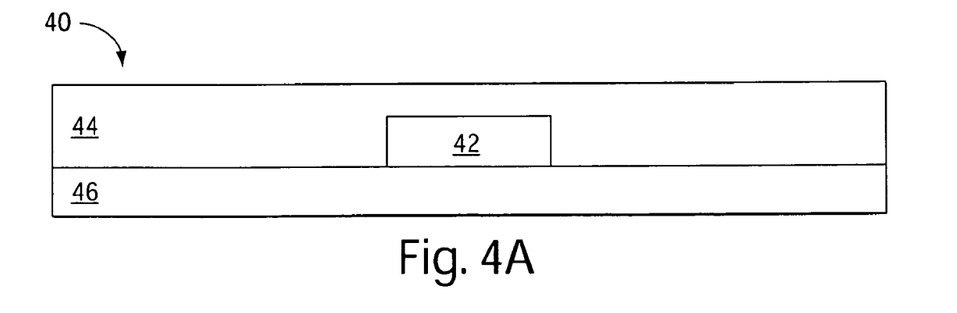
FIG. 4A is a side view of a computer chip packaging where a thermally conductive polymer layer directly contacts the computer chip.
Figure 4B:
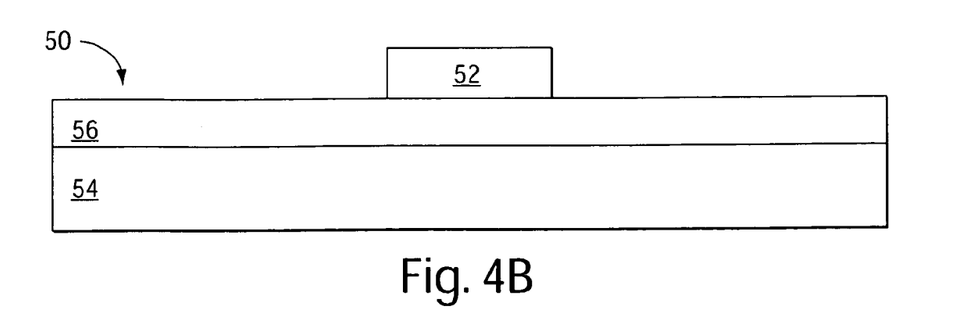
FIG. 4B is a side view of a computer chip packaging where a thermally conductive polymer layer acts as a heat spreader contacting a substrate layer that holds electric circuits for computer chips.

As power increases with increasing electronic functionality, thermal management automatically becomes an important issue. Heat spreading in electronic packaging is critical for their overall performance and reliability. While the oriented plastics presented here are electrically insulative, local heating can be channeled away to other less sensitive regions. It is possible to use oriented polymer sheets in electronic packaging that are typically ceramic, currently used for silicon dies and other types of electronics chips. Some examples of computer chip packaging are presented in FIGS. 4A and 4B. One embodiment of a computer chip packaging 40 is given in FIG. 4A, where the computer chip 42 is surrounded by a PE layer 44 on top and an underlying substrate 46 on bottom. The PE layer 44 conducts heat away from the chip. Another embodiment of a computer chip packaging 50 is given in FIG. 4B, where the computer chip 52 lies above a substrate 56, which also lies above a PE layer 54. Here, the PE layer 54 has oriented polymer chains such that heat is conducted laterally away from the computer chip. For higher heat generating chips or hot spots, thicker polymer layers may be required. Thermal conductivity across layers can be improved by additives as described in previous section.

In some embodiments, oriented polymers can serve as a heat spreading layer for printed circuit boards. This layer can also be used along with layers providing other functionality for printed circuit boards. Such combinations of oriented polymer layers with layers of other functionality are anticipated for a variety of applications.

Figure 5:
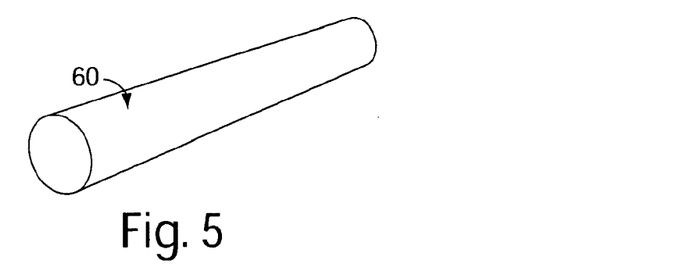
FIG. 5 depicts a heat pipe made of thermally conductive polymers.

The oriented polymers can also be used as in FIG. 5 as casing material for heat pipes 60. As described previously, thermal conductivity in the direction across walls can be enhanced by additives. As heat pipe casings are currently made primarily of metals, the use of polymers can enable the use of not only flexible heat pipes, but in corrosive environments as well. Use of polymers can also allow for a variety of shapes for heat pipes, e.g., from circular to rectangular, meeting different applications. Internal surfaces of the heat pipe can be easily structured to form capillary channels for liquid return from the condensing section to the evaporating section of the heat pipes.

In addition, this heat spreading capability can be extended past the traditional electronics industry to commonly used items such as clothing, apparel, seats, cups, or anything that has thermal applications. Examples of articles of clothing that frequently contain varying thermal distributions, but are not limited to, include gloves, shirts, shoes, coats, jackets, and boots. Seats that typically undergo variations in heat include, but are not limited to, chairs, couches, car seats, and benches. It is also of interest to conduct heat evenly to drinking elements such as, but not limited to, cups, glasses, and mugs. Incorporation of heat spreading layers into batteries could also help improve overall performance and efficiency. It is particularly advantageous to use the polymer sheets inside the battery and also continuing to the outside. The internal portion extracts heat generated in the volume of the battery and the external part serves as surfaces that spread heat to ambient locations.

There are numerous possibilities available once the thermal conductivity properties of polymers are well controlled. In general, with this invention it is possible to improve structures used to spread heat with low cost plastics, to improve plastics currently used for electronics packaging such that they can handle more power, and branch out into areas where thermally conductive plastics have never before been considered.

Figure 6A:
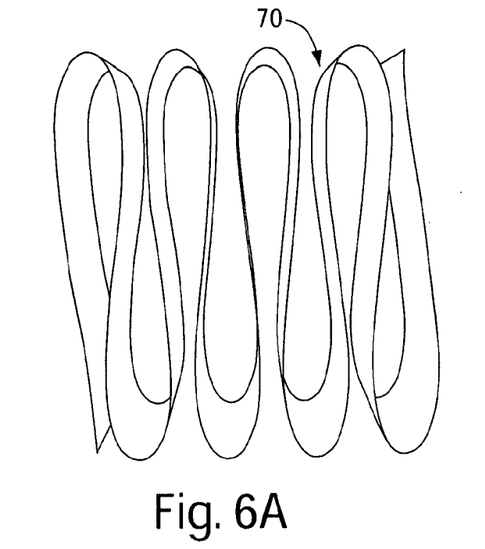
FIG. 6A depicts one example of how a thermally conductive polymer sheet can be shaped for different applications.
Figure 6B:
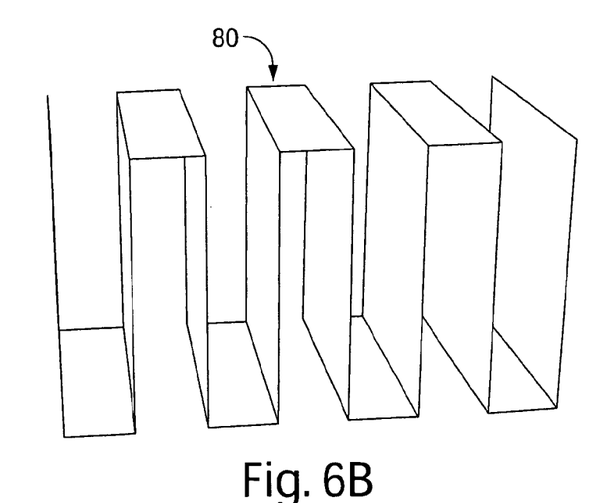
FIG. 6B depicts another example of how a thermally conductive polymer sheet can be shaped for different applications.

Some examples of shaping thermally conductive polymer films are shown in FIGS. 6A and 6B. Certain dimensions in this finned type of structure can be shrunken to small distances such that the layer thickness is comparable to that of micron range pores, leading to large surface-contact areas where heat exchange readily occurs. Hollow tubes made of such polymers can serve as pipes in heat exchangers. In the limit of hollow fibers filled with some liquid, such hollow fiber-type heat-pipes can serve as part of soldier clothing for heat distribution.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. For example, illustrative embodiments described above and the claims below relate to sheets having anisotropic thermal conductivity characteristics, but other body forms may include such characteristics, including solid molded articles, rods, tubes, blocks, and others. Accordingly, the foregoing description and drawings are by way of example only.

What is claimed is:

1. A sheet material comprising:
    at least one layer of substantially aligned polymer chains having a width and length substantially larger than a thickness, wherein the at least one layer of substantially aligned polymer chains is in a stretched state relative to a starting precursor of the polymer chains, the at least one layer having a stretch ratio of greater than 100, wherein the stretch ratio is obtained by stretching of the polymer chains while in contact with a solvent for a period of time sufficient to achieve said stretch ratio, wherein the substantially aligned polymer chains in the stretched state causes the sheet material to exhibit an anisotropic thermal conductivity of greater than 40 W/mK in at least one preferred direction.

2. The sheet material of claim 1, wherein the aligned polymer chains include ultra high molecular weight polyethylene (UHMWPE), polyethylene (PE), polytetrafluoroethylene (PTFE), polyester, or poly(p-phenylene sulfide).

3. The sheet material of claim 1, wherein the at least one layer exhibits a thermal conductivity of between 40 W/mK and 400 W/mK in the at least one preferred direction.

4. The sheet material of claim 3, wherein the preferred direction of thermal conductivity is along the aligned polymer chains.

5. The sheet material of claim 3, wherein the sheet exhibits a stretch ratio of between 100 and 400 relative to the starting precursor of the polymer chains.

6. The sheet material of claim 1, wherein the conductivity is at least 10 times greater in one preferred direction than another non-preferred direction.

7. The sheet material of claim 6, wherein the preferred direction is along the aligned polymer chains.

8. The sheet material of claim 1, wherein the sheet is uni-directionally or bi-directionally stretched.

9. The sheet material of claim 1, wherein the sheet comprises additives.

10. The sheet material of claim 9, wherein the additives comprise one or a combination of carbon nanotubes or graphite layers.

11. The sheet material of claim 9, wherein the additives are substantially aligned.

12. The sheet material of claim 1, wherein the sheet has a thickness of less than 1000 nanometers.

13. The sheet material of claim 1, wherein the thickness is greater than 0.005 millimeters.

14. The sheet material of claim 1, wherein the at least one layer has a unidirectional stretch ratio of greater than 100.

15. A method of forming a polymer sheet, comprising:
providing a polymer precursor with polymer chains having a first polymer chain orientation;
contacting the polymer precursor with a solvent; and
modifying the first polymer chain orientation of the precursor by stretching the polymer precursor while in the presence of the solvent to form a sheet having a second polymer chain orientation in which the polymer chains are substantially more aligned than in the first polymer chain orientation, wherein the stretching of the polymer precursor causes the sheet to exhibit an anisotropic thermal conductivity of greater than 40 W/mK in at least one preferred direction.

16. The method of claim 15, wherein, in the modifying step, stretching of the polymer precursor while in the presence of the solvent to form a sheet having a second polymer chain orientation in which the polymer chains are substantially more aligned than in the first polymer chain orientation comprises changing intermolecular chain bonding.

17. The method of claim 16, wherein changing intermolecular chain bonding comprises mechanically aligning the polymer chains of the polymer precursor to exhibit the second polymer chain orientation.

18. The method of claim 17, wherein the solvent comprises at least one of xylene or decahydronaphthalene.

19. The method of claim 15, wherein during the modifying step, the polymer is heated to a specified temperature.

20. The method of claim 19, wherein the specified temperature is between 100-150° C.

21. The method of claim 19, wherein heating to the specified temperature comprises placing the polymer precursor in a heated solvent.

22. The method of claim 15, wherein the modifying step further comprises at least one of imparting shear, fast quenching, administering polarized light, spin coating, injection molding, or extrusion of the polymer precursor.

23. The method of claim 15, wherein the modifying step further includes cooling to a specified temperature, cooling rate control or gyration control.

24. The method of claim 15 further comprising rolling the polymer precursor at high pressure or pressing.

25. The method of claim 15, wherein stretching of the polymer precursor causes the sheet to exhibit an anisotropic thermal conductivity of between 40 W/mK and 400 W/mK in the at least one preferred direction and the sheet exhibits a stretch ratio of between 100 and 400 relative to the polymer precursor.

26. The method of claim 15, wherein the modifying step further comprises swelling of the polymer precursor to a gel.

27. The method of claim 15, wherein contacting the polymer precursor with a solvent comprises swelling of the polymer precursor to a gel.

28. An article of manufacture, comprising:
a sheet including substantially aligned polymer chains that function to distribute heat anisotropically along at least one preferred direction of the sheet, wherein the sheet is in a stretched state relative to a starting precursor of the polymer chains, the sheet having a stretch ratio of greater than 100 wherein the stretch ratio is obtained by stretching of the polymer chains while in contact with a solvent for a period of time sufficient to achieve said stretch ratio, wherein the substantially aligned polymer chains in the stretched state causes the sheet to exhibit a thermal conductivity of greater than 40 W/mK in at least one preferred direction.

29. The article of claim 28, wherein the polymer chains are aligned towards a heat source.

30. The article of claim 28, wherein the article is constructed and arranged for incorporation in a heat exchanger or a heat spreading layer.

31. The article of claim 28, wherein the sheet exhibits a thermal conductivity of between 40 W/mK and 400 W/mK in the at least one preferred direction and the sheet exhibits a stretch ratio of between 100 and 400 relative to a starting precursor of the polymer chains.

* * * * *